3,154,606
MOLDING CELLULAR POLYURETHANE PLASTICS

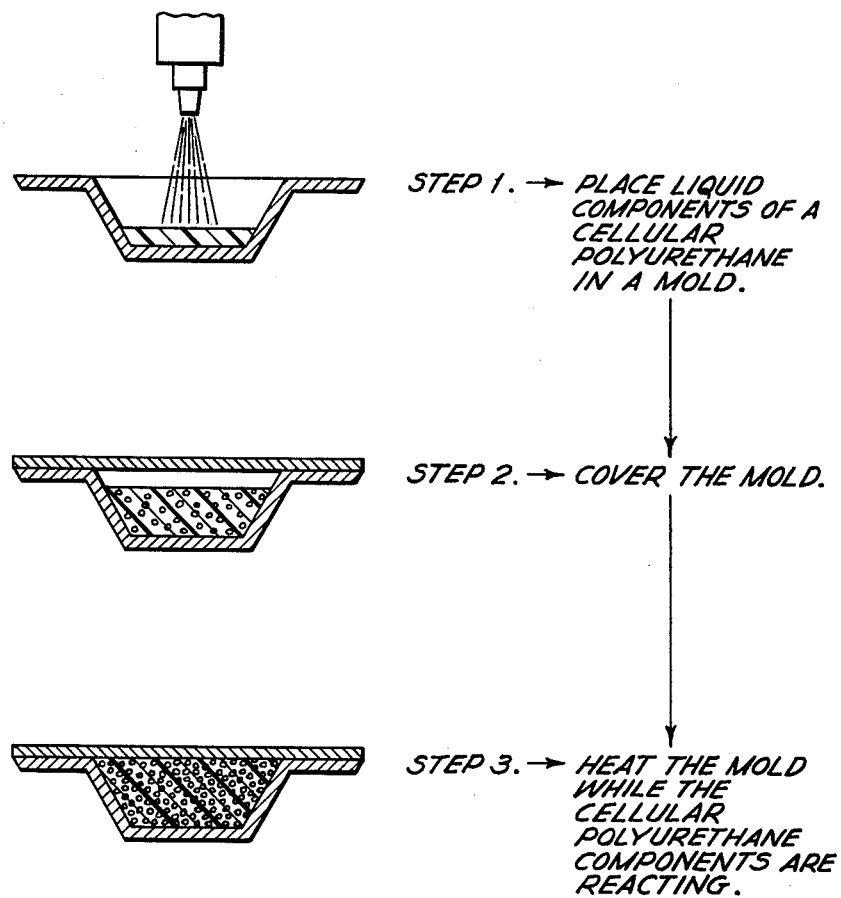

Andrew S. Morecroft and John F. Szabat, New Martinsville, W. Va., assignors to Mobay Chemical Company, Pittsburgh, Pa., a corporation of Delaware
Filed Dec. 15, 1959, Ser. No. 859,556
6 Claims. (Cl. 264—54)

The invention relates to cellular polyurethane plastics and more particularly to an improved method for the preparation, molding and processing of cellular polyurethane plastics.

Cellular polyurethane plastics may be produced by mixing the liquid components thereof and allowing them to react and expand to form a cellular product. For example, one may combine an organic polyisocyanate, water and an organic compound containing at least two active hydrogen containing groups in a mixer such as is disclosed, for example, in United States Patent Re. 24,514 issued to Peter Hoppe et al. on August 12, 1958, and place the mixed ingredients in a mold where they will react and expand to form a cellular product. These reactions are known to be spontaneous and exothermic. It is also known to produce cellular polyurethane plastics under anhydrous conditions from polyesters having terminal carboxyl groups and organic polyisocyanates through both a chain extension reaction between the carboxyl group of the acid and a gas producing reaction between the same components. It has been proposed to add heat to these components to improve the efficiency of the carbon dioxide producing reaction.

It has been proposed heretofore to heat the cellular product after the foaming reaction has reached completion to improve its properties. While this post curing effects an improvement in the physical properties of the cellular polyurethane plastic, it does not replace the effect of the loss of the exotherm. This is particularly true when thin sheets or thin moldings of cellular polyurethane plastics are to be prepared.

It is an object of this invention to provide an improved method of making cellular polyurethanes. Another object of this invention is to provide an improved method of molding cellular polyurethane plastics in relatively thin sections. Still another object of this invention is to provide an improved method of molding thin slabs of cellular polyurethanes. A further object of the invention is to provide for the adjustment of the loss of the exotherm resulting from the combination of the ingredients employed in the preparation of a cellular polyurethane. A further object of the invention is to provide improved cellular polyurethane plastics. Another object of the invention is to provide for control of the loss of heat from the reaction leading to the formation of a cellular polyurethane plastic resulting from the combination of water, an organic polyisocyanate and an organic compound containing at least two active hydrogen containing groups.

These and other objects of the invention will become apparent from the following description and the accompanying drawing. The drawing illustrates the steps of the invention wherein the liquid components of a cellular polyurethane are placed in a mold, the mold is covered and then heated while the cellular polyurethane components are reacting.

The foregoing objects and others which will become apparent from the following description are accomplished in accordance with the invention, generally speaking, by providing a method of molding cellular polyurethanes which involves heating the mold containing liquid components which are reacting to form a cellular polyurethane at a rate whereby the temperature of the mold proximates temperature of the reacting components. Thus, this invention contemplates a method of making cellular polyurethane plastics which involves mixing the liquid components of a cellular polyurethane, placing the mixed components in a mold which is initially at approximately the temperature of the mixed components, allowing said components to react to form a cellular polyurethane and substantially simultaneously raising the temperature of the mold surrounding said components so that the temperature of the mold is approximately equal to the temperature of the reacting components. In other words, the temperature of the mold is increased at such a rate that there is very little heat transfer through the mold.

When thick sections, for example, those eight inches or more in thickness, are prepared the reaction mixture retains a sufficient amount of exotherm at the center of the block to produce the desired physical properties, but the edges of the block will benefit from the process of the invention. The invention is particularly adapted to the production of thin sections of cellular polyurethane plastics such as are used, for example, for topper pads for seat cushions and the like and as rug underlay. In accordance with this embodiment of the invention, the components of a cellular polyurethane plastic are mixed and passed into a zone where the temperature of the mold surrounding the mixed components is raised simultaneous with the rise in temperature of the reaction components due to the exotherm of the reaction. The zone preferably comprises radiant heaters which can quickly raise the temperature of the mold and thereby simulate the reaction temperature at the center of a thicker block of foam. Thin sections of cellular polyurethanes as used above refer to those having a thickness of about 1, 2, 3 or 4 inches. It is an essential feature of the invention that the heat supplied be sufficient to prevent substantial loss of the exotherm of the reaction but it should not materially increase the temperature of the reactants beyond the increase caused by the exotherm of the reaction. Any suitable source of heat may be used which will sufficiently heat the mold to proximate the exotherm of the reaction but it is preferred to employ radiant heat such as is obtained for example from electric resistance heaters.

In the molding of topper pads for seat cushions, for example, it is desirable to employ a closed mold to avoid the necessity of cutting the topper pad to conform to the shape of the seat for which it was designed. In accordance with this process the components of a cellular polyurethane plastic are combined and placed in a mold heated to a temperature within the range of from about 25° C. to about 55° C. which may be fitted with a free floating lid. The lid is applied and the covered mold is placed in the heating zone. Then, as the reaction between the components of the cellular polyurethane plastic proceeds, the exotherm of the components increases from a temperature within the range of from about 25° C. to about 55° C. to a temperature within the range of from about 90° C. to about 130° C. and substantially simultaneous with this increase in the exotherm, the temperature of the mold is increased. Of course, it may be necessary to have the temperature of the atmosphere surrounding the mold containing the components of said cellular polyurethane plastic above the maximum exotherm in order to maintain the temperature of the mold within the desired range. The atmosphere around the mold may reach a temperature within the range of from about 150° C. to about 300° C. but the temperature of the mold should only increase at about the same rate as the exotherm of the reaction. The closed mold is placed in the heated zone immediately after closure. A residence time of from about one to about three minutes in the heated zone is usually required to maintain the temperature of the mold in the desired range.

The invention therefore provides improvements in the production of cellular polyurethane plastics in a simple and convenient manner. For one thing, the invention makes it possible to reduce mold cycle time, since the finished product may be removed from the mold in about ten minutes from the time that the liquid reactive ingredients are inserted. Moreover, the surface characteristics of the molded item are improved since there has been noted a marked improvement in mold release. Still further the physical properties of cellular polyurethane plastics originally foamed to a maximum thickness of not more than about four inches are improved by the invention. Thus, foam densification experienced when thin foam structures were produced without the conservation of the exotherm has been minimized.

One cannot charge the liquid reactive ingredients of a cellular polyurethane into a mold previously heated to the maximum exotherm of the reaction mixture and obtain a satisfactory foam. In other words, the temperature of the environment of the reaction mixture i.e., the mold shell or other surface on which the foaming reaction is carried out should increase at approximately the same rate as the exotherm of the reaction mixture increases. Thus, for example, a mold shell at a temperature of about 35° C. to about 45° C. in an environment at about 25° C. may be charged with the mixed ingredients of a cellular polyurethane plastic and then the temperature of the mold shell is caused to increase in about 1 to about 3 minutes to a temperature within the range of about 90° C. to about 130° C., approximately the maximum exotherm of the reaction mixture. Consequently, it is preferred to charge a mold shell heated to about 35° C. to about 45° C. with a reaction mixture at a temperature within approximately this same range and then cover the mold and place it in a radiantly heated zone to establish at the inner mold surface a temperature of about 90° C. to about 130° C. in about two minutes. After the foaming reaction is complete the temperature of the mold is lowered to from about 50° C. to about 100° C. and the molded item removed.

The process of the invention is most advantageously employed in the production of cellular polyurethane plastics having a maximum thickness of about 4 inches or less by a molding technique as opposed to placing the mixed reactive ingredients on a flat surface and allowing them to foam to produce a cellular polyurethane plastic. In a preferred molding technique of the present invention, a mixture of liquid reactive ingredients comprising water, an organic polyisocyanate and an organic compound containing at least two active hydrogen containing groups in the molecule as determined by the Zerewitinoff method are intimately mixed together in a machine mixer such as is disclosed, for example, in U.S. Reissue Patent 24,514 to Hoppe et al. issued August 12, 1958 and placed in a mold shell adapted to permit a maximum thickness of the resulting cellular polyurethane plastic of about 4 inches or less and then the mold is covered with a floating lid and immediately placed in a heated zone in accordance with the disclosure above. The molds are preferably made of metal about one-eighth inch to three-eighths inch in thickness. Aluminum molds are preferred but any other suitable metal such as steel for example may be used. The term "floating lid" as used herein, refers to unfastened lids for mold shells whose external dimensions are at least equivalent to and may be greater than the maximum external dimensions of the top of the mold. In other words, a lid is placed over the top of the mold but is not fastened to the top of the mold so that it may be raised by the foaming mixture in the event that an excessive charge of the mixture of liquid reactive ingredients is introduced into the mold. However, care should be exercised in charging the mold to avoid extrusion of the cellular polyurethane plastic from the mold between its upper edge and the free floating lid. After the closed mold has been charged it is placed in a zone equipped with radiant heaters and the temperature of the mold is increased concurrent with the increase of the exotherm of the liquid reactive ingredients. However, the mold need not remain in said heated zone for any substantial length of time after the foaming reaction has reached completion. Moreover, the molded cellular polyurethane plastic may be removed from the mold and the mold returned for another mold cycle in approximately 10 minutes.

The invention may be carried out, for example, by positioning the discharge nozzle of a mixer for the components of a cellular polyurethane plastic over the center of a mold shell and making a single pass down the length of the mold shell to insert therein the proper amount of fluid ingredients to fill the mold with cellular product. A free floating lid is then placed over the mold shell containing the liquid reactive ingredients, thereby closing the mold. The closed mold is then passed between parallel banks of electric resistance heaters. The temperature of the mold is then raised concurrently with the increase in temperature inside the mold to conserve the exotherm of the reaction. After the foaming reaction is complete, the mold is removed from the radiantly heated zone created by the electric resistance heaters. The mold lid is then removed and the molded cellular polyurethane taken from the mold and allowed to post-cure, either with or without further heat.

Any suitable organic polyisocyanate may be used for the preparation of the cellular polyurethane plastic of this invention, such as, for example, those disclosed in United States Reissue Patent 24,514 to Hoppe et al., issued August 12, 1958. Arylene diisocyanates are preferred, such as, for example, 2,4-toluylene diisocyanate, 2,6-toluylene diisocyanate, p,p'-diphenyl methane diisocyanate, 1,5-naphthalene diisocyanate, triphenyl methane triisocyanate and the like. Particularly suitable arylene diisocyanates for this reaction is a mixture of about 20 percent 2,6-toluylene diisocyanate and about 80 percent 2,4-toluylene diisocyanate.

Any suitable organic compound containing at least two active hydrogen containing groups as determined by the Zerewitinoff test may be used, such as, for example, hydroxyl polyesters, polyhydric polyalkylene ethers, polyhydric polythioethers, polyacetals and polyester amides. It is preferred that the organic compound have a molecular weight above about 500 and most preferably within the range of about 1000 to 5000, an hydroxyl number within the range of about 25 to about 150 and most preferably within the range of about 35 to 80 and acid numbers, where applicable, preferably below about 5 and most preferably below about 1.

Any suitable hydroxyl polyester may be used, such as, for example, the reaction product of a polycarboxylic acid with an excess of a polyhydric alcohol. Any suitable polycarboxylic acid may be used, such as, for example, adipic acid, sebacic acid, phthalic acid, terephthalic acid, maleic acid, malonic acid, thiodipropionic acid and the like. Any suitable polyhydric alcohol may be used, such as, for example, ethylene glycol, propylene glycol, butylene glycol, amylene glycol, glycerine, trimethyol propane, pentaerythritol and the like.

Any suitable polyhydric polyalkylene ether may be used such as, for example, the condensation product of alkylene oxides and a polyhydric alcohol. Any suitable alkylene oxide may be used, such as, for example, ethylene oxide, propylene oxide, butylene oxide, amylene oxide and the like. It is preferred to employ polyhydric polyalkylene ethers prepared from alkylene oxides having from two to five carbon atoms, such as, for example, polypropylene ether glycol, polyethylene ether glycol, polybutylene ether glycol or mixtures thereof having a molecular weight of at least about 500. Moreover, the condensation product of the aforementioned alkylene oxides and a polyhydric alcohol having from 2 to 4 hydroxyl groups, such as, for example, ethylene glycol, propylene glycol, trimethylol propane, glycerol, triethanol amine, pentaerythritol and the like may be used. The polyhydric polyalkylene ethers may be prepared by any known process, such as, for example, by the process described by Wurtz in 1859 and in "Encyclopedia of Chemical Technology," vol. 7, pages 257 to 262, published by Interscience Publishers, Inc., 1951, or in U.S Patent 1,922,459.

Any suitable polyhydric polythioether may be used, such as, for example, the reaction product of a polyhydric alcohol with a thioether glycol. Any suitable polyhydric alcohol may be used, such as, for example, ethylene glycol, propylene glycol, butylene glycol, trimethylol propane, pentaerythritol and the like. Any suitable thioether glycol may be used, such as, for example, diethylene glycol thioether and the like.

Any suitable polyacetal may be used, such as, for example, the reaction product of an aldehyde, such as, for example, formaldehyde, with a polyhydric alcohol, such as, for example, ethylene glycol or one of the other polyhydric alcohols disclosed above for reaction with the polycarboxylic acids and/or alkylene oxides used in the preparation of the hydroxyl polyesters and polyethers respectively.

Any suitable polyester amide may be used, such as, for example, the reaction product of an amine, such as ethylene diamine and an alkylene glycol such as ethylene glycol with a polycarboxylic acid as disclosed for the preparation of the hydroxyl polyesters.

One can also employ tetrahalo hydrocarbons in conjunction with the balance of the components of the cellular polyurethane plastic, such as, for example, trichlorofluoro methane and the like to exhibit a beneficial effect on the properties of the cellular polyurethane plastic. The employment of these compounds is not an essential feature of the invention, however.

It is often advantageous to carry out the reaction in the presence of a catalyst. Any suitable catalyst may be used such as, for example, dibutyl tin di-2-ethyl hexoate, stannous octoate, triethylene diamine, N-ethyl morpholine, N-methyl morpholine, dimethylauryl amine, and the like. In any case and especially in the production of cellular polyurethane plastics based on the above described polyhydric polyalkylene ethers by a one-step process, it is advantageous to employ mixtures of the metal containing catalyst and the tertiary amine catalyst.

In many cases it is desirable and indeed in some cases it may be necessary to carry out the reaction in the presence of a stabilizer or emulsifier. In the production of cellular polyurethane plastics based on polyhydric polyalkylene ethers by a one-step process wherein the water, an organic polyisocyanate and a polyhydric polyalkylene ether are mixed together substantially simultaneously in a single step and inserted into the mold, it has been found necessary to carry out the reaction in the presence of a silicone oil which contains some mixed oxyalkylene block copolymer in the molecule. Suitable silicone oils for this process may be found in U.S. Patent 2,834,748 to Bailey et al. issued May 13, 1958. In the preparation of cellular polyurethane plastics from organic polyisocyanate modified polyhydric polyalkylene ethers having terminal —NCO groups by reaction thereof with water, it is advantageous to employ a substantially linear dimethyl polysiloxane having a viscosity of about 50 cts. at 25° C. The same silicone oil may be used as a stabilizer in the production of a cellular polyurethane plastic based on polyesters. Emulsifiers such as the sulfonated oils, for example, sulfonated castor oil, are also suitable.

Thin sections of cellular polyurethane plastic have found many uses. However, it has been difficult to obtain thin sections of cellular polyurethane plastic without the necessity of preparing a large section having a thickness greater than about 4 inches and then slicing the thicker section into thinner parts. These thinner parts may be used, for example, for wall tile, headliners for automobiles, in the upholstery industry, for cushioning and the like, as well as other applications. The molded cellular polyurethane plastics having a maximum thickness of about 4 inches are also suitable for the above applications and in addition, it has been found particularly advantageous to prepare thin molds for use as topper pads for automobile seat cushions and the like.

The invention is further illustrated by the following examples in which the parts are by weight.

*Example 1*

About 100 parts of a trihydric polyalkylene ether obtained from the condensation of propylene oxide with glycerine in the molar ratio of about 50:1 and condensed to a molecular weight of about 3000 and having an hydroxyl number of about 56, about 42.5 parts of a mixture of 80 percent 2,4-toluylene diisocyanate and 20 percent 2,6-toluylene diisocyanate, about 3.5 parts of water, about 1.5 parts of a silicone oil having the formula

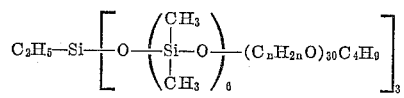

wherein $(C_nH_{2n}O)$ is a mixed polyoxyethylene and oxypropylene block copolymer containing about 17 oxyethylene units and about 13 oxypropylene units, about 0.2 part of triethylene diamine and about 0.07 part of dibutyl tin di-2-ethyl hexoate were combined in a machine mixer such as disclosed in U.S. Reissue Patent 24,514 to Hoppe et al., issued August 12, 1958, and inserted into an aluminum mold shell which had been previously heated to a temperature of about 40° C. The temperature of the mixture of liquid reactive ingredients at the time that they were placed in the aluminum mold shell was about 30° C. A free floating lid was placed over the top of the mold and placed in an oven equipped with radiant heaters i.e., chrome ribbon heaters within about 20 seconds after the mold was charged. The temperature of the covered mold was raised from about 30° C. to about 100° C. in about 1½ minutes and then removed and allowed to stand at room temperature for an additional 8 minutes. The mold cover was removed and the molded cellular polyurethane plastic was taken from the mold and post-cured for about 30 minutes in atmospheric steam and then cured for about one hour at about 130° C. The resulting pad had the following physical properties:

Density _____ 2.2 lbs./ft.³.
Tensile strength _____ 20 lbs./in.².
Elongation _____ 300%
Tear strength _____ 3 lbs./in.².
Compression 25% rest _____ 18 lbs./50 in.².
Compression set _____ 15%

The process of the above examples was repeated except that the closed mold containing the mixture of ingredients was allowed to stand at room temperature until the reaction was completed. The resulting cellular polyurethane plastic could not be removed from the mold for about 45 minutes without deforming the surface thereof.

Example 2

About 69 parts of a trihydric polyalkylene ether obtained from the condensation of propylene oxide with glycerine in the molar ratio of about 50:1 condensed to a molecular weight of about 3000 and having an hydroxyl number of about 56, about 23 parts of a polypropylene ether glycol having a molecular weight of about 2000 and an hydroxyl number of about 56, about 41.5 parts of a mixture of 80 percent 2,4-toluylene diisocyanate and 20 percent 2,6-toluylene diisocyanate, about 3.5 parts of water, about 2.0 parts of a silicone oil having the formula

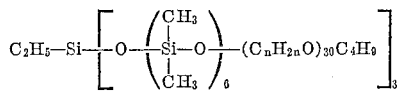

wherein $(C_nH_{2n}O)$ is a mixed polyoxyethylene and oxypropylene block copolymer containing about 17 oxyethylene units and about 13 oxypropylene units, about 0.2 part of triethylene diamine and about 0.5 part of stannous octoate were combined in a machine mixer such as disclosed in U.S. Reissue Patent 24,514 to Hoppe et al., issued August 12, 1958, and inserted into an aluminum mold shell which has been previously heated to a temperature of about 40° C. The temperature of the mixture of liquid reactive ingredients at the time that they were placed in the aluminum mold shell was about 30° C. A free floating lid was placed over the top of the mold and placed in an oven equipped with radiant heaters i.e. chrome ribbon heaters within about 20 seconds after the mold was charged. The covered mold was allowed to remain in the oven for about 3.5 minutes thereby raising the temperature of the mold from about 30° C. to about 100° C. and then removed and allowed to stand at room temperature for an additional 8 minutes. When the mold cover and the molded cellular polyurethane plastic were removed from the mold, the resulting cellular polyurethane plastic was post cured and had the following physical properties:

| | |
|---|---|
| Density | 1.6 lbs./ft.$^3$ |
| Tensile strength | 22 lbs./in.$^2$ |
| Elongation | 310% |
| Tear strength | 2.8 lbs./in.$^2$ |
| Compression 25% rest | 18 lbs./50 in.$^2$ |
| Compression set | 11% |

The process of the above example was repeated except that the closed mold containing the mixture of ingredients was allowed to stand at room temperature until the reaction was completed. The resulting cellular polyurethane plastic could not be removed from the mold for about 45 minutes without deforming the surface thereof.

It is to be understood that any of the other suitable organic polyisocyanates, blowing agents, organic compounds containing at least two active hydrogen groups in the molecule, catalysts, stabilizers and the like described herein, can be substituted for the particular ones employed in the preceding examples with equally satisfactory results. Moreover, any temperature within the ranges specified above could have been substituted for those in the preceding examples with equally satisfactory results.

Although the invention has been described in considerable detail in the foregoing for the purpose of illustration, it is to be understood that such detail is solely for this purpose and that variations can be made therein by those skilled in the art without departing from the spirit and scope of the invention except as set forth in the claims.

What is claimed is:

1. The method of producing a cellular polyurethane with improved physical characteristics which comprises heating a closed mold containing liquid components which are reacting to form a cellular polyurethane at a rate whereby the temperature of the mold-cellular polyurethane interface proximates the temperature of the reacting components.

2. The method of making cellular polyurethanes which comprises mixing the liquid components of a cellular polyurethane, placing the mixed components in a mold which is initially at approximately the temperature of the mixed components, allowing said components to react to form a cellular polyurethane and substantially simultaneously raising the temperature of the mold containing said mixed components so that the temperature of the mold is approximately equal to the temperature of the reacting components.

3. In the molding of cellular polyurethanes by a process which comprises placing a mixture of an organic polyisocyanate, an organic compound containing at least two active hydrogen containing groups and a blowing agent in a mold and allowing them to react to form a cellular polyurethane, the improvement which comprises placing the mixed liquid reactive ingredients of said cellular polyurethane in a mold at a temperature within the range of from about 25° C. to about 55° C. covering the mold, placing the mold in a heated zone and thereby raising the temperature of the mold in from about one minute to about three minutes to a temperature within the range of from about 90° C. to about 130° C. and allowing the foaming reaction to proceed to completion.

4. A process for the molding of cellular polyurethanes having a maximum thickness of about 4 inches which comprises mixing an organic polyisocyanate with water and an organic compound containing at least two active hydrogen containing groups, placing the resulting mixture in a mold at a temperature within the range of from about 25° C. to about 55° C., closing the mold and thereafter raising the temperature of the mold within from about one minute to about three minutes to a temperature within the range of from about 95° C. to about 130° C. and maintaining the mold containing said mixture at a temperature within the range of about 90° C. to about 130° C. for from about one minute to about ten minutes, thereafter allowing the mold and contents to cool to a temperature within the range of from about 50° C. to about 100° C. and removing the molded cellular polyurethane from the mold.

5. In the molding of topper pads for seat cushions said topper pads having a maximum thickness of about 4 inches as initially prepared, by a process which comprises introducing into a mold the ingredients of a cellular polyurethane, allowing said ingredients to react to form a cellular polyurethane and removing the resulting cellular polyurethane topper pad from the mold, the improvement which comprises inserting the liquid reactive ingredients of said cellular polyurethane comprising an organic polyisocyanate, an organic compound containing at least two active hydrogen containing groups and a blowing agent into a mold at a temperature within the range of from about 35° C. to about 45° C., covering the mold and placing it in a heated zone within a maximum of about 30 seconds after the insertion of the liquid reactive ingredients of said cellular polyurethane and thereafter raising the temperature of said mold from an initial temperature within the range of from about 35° C. to about 45° C. to a temperature within the range of from about 90° C. to about 130° C. in from about one minute to about three minutes, allowing the mold and the resulting cellular polyurethane to cool to a temperature within the range of from about 50° C. to about 100° C. and removing said molded cellular polyurethane topper pad from the mold.

6. A process for the molding of cellular polyurethanes having a maximum thickness of about 4 inches which comprises mixing an organic polyisocyanate with water and an organic compound containing at least two active hydrogen containing groups, placing the resulting mixture in a mold at a temperature within the range of from about 25° C. to about 55° C., closing the mold and thereafter raising the temperature of the mold within from about one minute to about three minutes to a temperature within the range of from about 95° C. to about 130° C. and maintaining the mold containing said mixture at a temperature within the range of about 90° C. to about 130° C. for from about one minute to about ten minutes, thereafter allowing the mold and contents to cool and removing the molded cellular polyurethane from the mold.

References Cited in the file of this patent

UNITED STATES PATENTS

| | | |
|---|---|---|
| 2,308,970 | Carter | Jan. 19, 1943 |
| 2,525,965 | Smith | Oct. 17, 1950 |
| 3,011,218 | Mitten | Dec. 5, 1961 |

FOREIGN PATENTS

| | | |
|---|---|---|
| 842,267 | Germany | Sept. 15, 1952 |
| 548,684 | Italy | Sept. 28, 1956 |

OTHER REFERENCES

N. S. Billington: Thermal Properties of Buildings, Cleaver-Hume Press Ltd., 1952, pp. 58 and 62.

Chemical & Engineering News (C & EN), vol. 36, No. 48, One-Shot Way to Urethane Foam, pp. 48 and 49, Dec. 1, 1958.